(12) United States Patent
Choi et al.

(10) Patent No.: US 8,623,960 B2
(45) Date of Patent: Jan. 7, 2014

(54) RESIN COMPOSITION FOR OPTICAL FILM, AND POLARIZER PROTECTIVE FILM AND LIQUID CRYSTAL DISPLAY INCLUDING THE SAME

(75) Inventors: Eun-Jung Choi, Daejeon (KR); Byoung-Il Kang, Daejeon (KR); Chang-Hun Han, Daejeon (KR); Jae-Bum Seo, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/355,156

(22) Filed: Jan. 20, 2012

(65) Prior Publication Data

US 2013/0190451 A1    Jul. 25, 2013

(51) Int. Cl.
| | |
|---|---|
| *C08L 69/00* | (2006.01) |
| *C08L 33/10* | (2006.01) |
| *C08L 33/08* | (2006.01) |
| *G02B 5/30* | (2006.01) |
| *C08J 5/18* | (2006.01) |

(52) U.S. Cl.
USPC ............. 525/148; 525/468; 428/1.1; 252/585

(58) Field of Classification Search
USPC ................... 525/148, 468; 428/1.1; 252/585
See application file for complete search history.

(56) References Cited

U.S. PATENT DOCUMENTS

| | | | |
|---|---|---|---|
| 6,753,404 B2 * | 6/2004 | Suh et al. ................. | 528/196 |
| 8,026,336 B2 | 9/2011 | Kato et al. | |
| 2009/0203841 A1 | 8/2009 | Takesue | |
| 2011/0183149 A1 | 7/2011 | Kang et al. | |
| 2011/0297896 A1 * | 12/2011 | Kim et al. ................. | 252/585 |

FOREIGN PATENT DOCUMENTS

| | | |
|---|---|---|
| CN | 102171277 | 8/2011 |
| JP | 10296914 A | 11/1998 |
| JP | 2004002897 A | 1/2004 |
| JP | 2007292944 A | 11/2007 |
| JP | 2010241883 A | 10/2010 |
| JP | 2011090268 A | 5/2011 |
| JP | 2011168742 A | 9/2011 |
| JP | 2011242754 A | 12/2011 |
| JP | 2011251154 A | 12/2011 |
| JP | 2012008517 A | 1/2012 |
| TW | 201040209 | 11/2010 |
| TW | 201107394 | 3/2011 |
| TW | 201144870 | 12/2011 |
| WO | 2009031544 A | 3/2009 |
| WO | WO 2010/095870 A2 * | 8/2010 |
| WO | 2010/0116822 | 10/2010 |

* cited by examiner

*Primary Examiner* — Fred M Teskin
(74) *Attorney, Agent, or Firm* — McKenna, Long & Aldridge, LLP

(57) ABSTRACT

Provided are a resin composition including an acryl-based copolymer resin including an alkyl(meth)acrylate-based monomer and an imide-based monomer, additionally copolymerizable with a styrene-based monomer, and a polycarbonate-based resin having a melt index (MI) of 30 g/10 min or more under conditions of a load of 1.2 kg and a temperature of 300° C., a polarizer protective film including the resin composition, and a liquid crystal display including the polarizer protective film. The polarizer protective film according to the present invention has excellent heat resistance, transparency, and optical properties.

14 Claims, No Drawings

RESIN COMPOSITION FOR OPTICAL FILM, AND POLARIZER PROTECTIVE FILM AND LIQUID CRYSTAL DISPLAY INCLUDING THE SAME

BACKGROUND OF THE INVENTION

1. Field of the Invention

The present invention relates to a resin composition for an optical film having excellent heat resistance and optical properties, a polarizer protective film including the same, and a liquid crystal display including the polarizer protective film.

2. Description of the Related Art

Display technologies using various devices replacing a conventional cathode ray tube, such as a plasma display panel (PDP) and a liquid crystal display (LCD), have been developed and have become commercially available on the basis of recent advancements in optical technology. The characteristics of polymer materials in such display devices have become highly advanced. For example, wide viewing angles, high contrast, prevention of changes in image color according to viewing angle, and uniformity of image display have become particularly important issues as liquid crystal displays have become lightweight and have been provided with large-sized picture areas as well as thin films.

A polarizing plate generally has a structure in which a triacetyl cellulose film (hereinafter, referred to as a "TAC film"), as a protective film, is stacked on a polarizer by using a water-based adhesive formed of a polyvinyl alcohol-based aqueous solution. However, both of a polyvinyl alcohol film used as the polarizer and the TAC film used as the protective film for a polarizer may have insufficient resistivity to heat and humidity. Accordingly, when a polarizing plate formed of the foregoing films is used over a prolonged period of time in a high-temperature or high-humidity environment, the polarizability thereof may degrade, the polarizer and the protective film may be separated or the optical properties thereof may deteriorate. Therefore, the foregoing polarizing plate may have various limitations in terms of the usage thereof.

Also, the TAC film has large changes in existing in-plane and thickness retardation values according to changes in an ambient temperature/humidity environment and in particular, changes in a retardation value with respect to incident light in an inclination direction may be large. When a polarizing plate, including a TAC film having the foregoing characteristics, is applied to a liquid crystal display as a protective film, image qualities may deteriorate because viewing angle characteristics may be changed according to changes in an ambient temperature/humidity environment. Further, the TAC film not only has a high dimensional change rate according to changes in an ambient temperature/humidity environment, but also has a relatively large photoelastic coefficient. Therefore, image quality may be easily deteriorated due to the occurrence of local changes in retardation value characteristics after durability evaluation in heat-resistant and moisture-resistant environments.

An acryl-based resin is a well-known material for compensating for various disadvantages of the TAC film. However, the acryl-based resin has insufficient heat resistance, and in-plane and thickness retardation values are generated after drawing. Therefore, the acryl-based resin may not be appropriate to be used as a protective film.

SUMMARY OF THE INVENTION

An aspect of the present invention provides a resin composition for a polarizer protective film having an appropriate retardation value for a protective film as well as excellent heat resistance and transparency.

Another aspect of the present invention provides a polarizer protective film including the resin composition and having excellent heat resistance, transparency, and optical properties, and a liquid crystal display including the polarizer protective film.

According to an aspect of the present invention, there is provided a resin composition including: an acryl-based copolymer resin including an alkyl(meth)acrylate-based monomer and an imide-based monomer, additionally copolymerizable with a styrene-based monomer; and a polycarbonate-based resin having a melt index (MI) of 30 g/10 min or more under conditions of a load of 1.2 kg and a temperature of 300° C.

According to another aspect of the present invention, there is provided a polarizer protective film including the resin composition.

According to another aspect of the present invention, there is provided a liquid crystal display including the polarizer protective film.

DETAILED DESCRIPTION OF THE PREFERRED EMBODIMENT

Hereinafter, the present invention will be described in more detail.

An aspect of the present invention provides a resin composition including an acryl-based copolymer resin including an alkyl(meth)acrylate-based monomer and an imide-based monomer, selectively copolymerizable with a styrene-based monomer, and a polycarbonate-based resin having a melt index (MI) of 30 g/10 min or more under conditions of a load of 1.2 kg and a temperature of 300° C.

In the present specification, a copolymer resin including a monomer denotes that the monomer is polymerized to be included in the copolymer resin as a repeating unit.

The acryl-based copolymer may be a block copolymer or a random copolymer, but the type of acryl-based copolymer is not limited thereto. Any polymerization method known for forming an acryl-based copolymer may be used, but bulk polymerization may also be used.

The acryl-based copolymer may be a copolymer including an alkyl(meth)acrylate-based monomer and an imide-based monomer, and may be a terpolymer further including a styrene-based monomer therein.

When the acryl-based copolymer is the foregoing copolymer, a content of the alkyl(meth)acrylate-based monomer may be in a range of about 70 wt % to 99 wt % and a content of the imide-based monomer may be in a range of about 1 wt % to 30 wt %.

On the other hand, when the acryl-based copolymer is the foregoing terpolymer, the content of the alkyl(meth)acrylate-based monomer may be in a range of about 69 wt % to 98 wt %, the content of the imide-based monomer may be in a range of about 1 wt % to 30 wt %, and a content of the styrene-based monomer may be in a range of about 1 wt % to 10 wt %.

In the acryl-based copolymer resin, the alkyl(meth)acrylate-based monomer denotes both an alkyl acrylate-based monomer and an alkyl(meth)acrylate-based monomer. An alkyl group of the alkyl(meth)acrylate-based monomer may have a carbon number of 1 to 10, for example, 1 to 4, and for example, may be a methyl group or an ethyl group. The alkyl(meth)acrylate-based monomer, for example, may be a methyl methacrylate, but the alkyl(meth)acrylate-based monomer is not limited thereto.

In the acryl-based copolymer resin, a content of the alkyl (meth)acrylate-based monomer may be in a range of 69 wt % to 99 wt % and for example, may be in a range of 75 wt % to 95 wt %. When the content of the alkyl(meth)acrylate-based monomer is within the foregoing range, transparency thereof may be excellent as well as heat resistance thereof being maintained.

The imide-based monomer in the acryl-based copolymer denotes a monomer including an imide group, and for example, may be a maleimide-based monomer or the like. Among the maleimide-based monomer, a maleimide-based monomer substituted with a cycloalkyl group or an aryl group may be used for improving heat resistance of the acryl-based copolymer.

The cycloalkyl group that may be substituted into the imide-based monomer may be a cycloalkyl group with a carbon number of 3 to 15 and for example, may be a cyclohexyl group. Also, the aryl group that may be substituted into the imide-based monomer may be an aryl group with a carbon number of 6 to 15 and for example, may be a phenyl group.

Particular examples of the imide-based monomer may be N-phenylmaleimide, N-cyclohexylmaleimide, N-methylphenylmaleimide, N-ethylphenylmaleimide, N-butylphenylmaleimide, N-naphthylmaleimide, N-hydroxyphenylmaleimide, N-methoxyphenylmaleimide, N-carboxyphenylmaleimide, N-nitrophenylmaleimide, N-tribromophenylmaleimide, etc. The foregoing monomers may be used alone, or two or more monomers may be used in combination with one another. Among the foregoing monomers, N-phenylmaleimide may be used in particular, but the imide-based monomer is not limited thereto. In general, a polarizer protective film may have a retardation value near 0, but it is very difficult to adjust the retardation value near 0 by using only the acryl-based copolymer resin. Therefore, in order to adjust the retardation value near 0 in the present invention, the acryl-based copolymer resin is mixed with the polycarbonate-based resin. However, since a molecular weight of the polycarbonate-based resin is smaller than that of the acryl-based copolymer resin, film toughness may decrease when the content of the polycarbonate-based resin in a composition increases, and the possibility of haze being generated may increase, because limitations in compatibility with the acryl-based resin occur. Therefore, it may be better when the content of the polycarbonate-based resin is less, but effects of adjusting the retardation value may decrease when the content of the polycarbonate-based resin is reduced. However, since N-phenylmaleimide has characteristics of preventing the generation of the retardation value of the acryl-based resin, the content of the polycarbonate-based resin used in melt mixing may be decreased when the N-phenylmaleimide is used in the acryl-based resin. Also, the N-phenylmaleimide may contribute to improve physical properties of the protective film because the N-phenylmaleimide has an advantage of improving heat resistance of the acryl-based resin itself.

The content of the imide-based monomer in the acryl-based copolymer resin may be in a range of 1 wt % to 30 wt %, and for example, may be in a range of 1 wt % to 20 wt %. When the content of the imide-based monomer is within the foregoing range, a decrease in mechanical strength may be minimized as well as heat resistance thereof being secured.

The styrene-based monomer in the acryl-based copolymer denotes a monomer including a styrene group. Examples of the styrene-based monomer may be styrene, α-methylstyrene, 3-methylstyrene, 4-methylstyrene, 2,4-dimethylstyrene, 2,5-dimethylstyrene, 2-methyl-4-chlorostyrene, 2,4,6-trimethylstyrene, cis-β-methylstyrene, trans-β-methylstyrene, 4-methyl-α-methylstyrene, 4-fluoro-α-methylstyrene, 4-chloro-α-methyl styrene, 4-bromo-α-methylstyrene, 4-t-butylstyrene, 2-fluorostyrene, 3-fluorostyrene, 4-fluorostyrene, 2,4-difluorostyrene, 2,3,4, 5,6-pentafluorostyrene, 2-chlorostyrene, 3-chlorostyrene, 4-chlorostyrene, 2,4-dichlorostyrene, 2,6-dichlorostyrene, octachlorostyrene, 2-bromostyrene, 3-bromostyrene, 4-bromostyrene, 2,4-dibromostyrene, α-bromostyrene, β-bromostyrene, 2-hydroxystyrene, 4-hydroxystyrene, etc. Among the foregoing styrene-based monomers, α-methylstyrene, for example, may be used in terms of ease of copolymerization and heat resistance, but the styrene-based monomer is not limited thereto.

In the acryl-based copolymer resin, the content of the styrene-based monomer may be in a range of 1 wt % to 10 wt %. When the content of the styrene-based monomer is within the foregoing range, control of physical properties of the resin may be facilitated as well as the heat resistance thereof being secured.

Also, the molecular weight of the acryl-based copolymer resin may be in a range of 50,000 to 300,000 in terms of heat resistance, processability, and productivity.

The acryl-based copolymer resin may have a glass transition temperature (Tg) of 120° C. or more, for example, 123° C. or more. The glass transition temperature of the acryl-based copolymer resin is not particularly limited, but the glass transition temperature of the acryl-based copolymer resin may be 200° C. or less.

Next, the polycarbonate-based resin is included in the resin composition to adjust the retardation value and a weight ratio between the acryl-based copolymer resin and the polycarbonate-based resin of the resin composition of the present invention may be in a range of 90:10 to 99:1 and for example, may be in a range of 95:5 to 99:1.

A polycarbonate-based resin having a melt index (MI) of 30 g/10 min or more under the conditions of a load of 1.2 kg and a temperature of 300° C. may be used as the polycarbonate-based resin included in the resin composition of the present invention. The reason for this is that compatibility with the acryl-based copolymer resin may deteriorate and transparency may decrease due to the generation of haze after the formation of the film when the MI of the polycarbonate-based resin is less than 30 g/10 min. More particularly, the MI of the polycarbonate-based resin may be in a range of about 30 g/10 min to 100 g/10 min, and for example, may be in a range of about 50 g/10 min to 100 g/10 min or about 70 g/10 min to 100 g/10 min. When the MI of the polycarbonate-based resin is more than 100 g/10 min, it may adversely affect film toughness.

The resin composition may be prepared by blending the acryl-based copolymer resin and the polycarbonate-based resin according to a method well-known in the art, such as a compounding method, and may include additives well-known in the art, such as a colorant, a flame retardant, a reinforcing agent, a filler, an ultraviolet (UV) stabilizer, and an antioxidant.

A glass transition temperature of the resin composition may be 120° C. or more, and for example, may be 123° C. or more. The glass transition temperature of the resin composition is not particularly limited, but the glass transition temperature of the resin composition may be 200° C. or less.

Also, a weight-average molecular weight of the resin composition may be in a range of 50,000 to 300,000 in terms of heat resistance, sufficient processability, and productivity.

Another aspect of the present invention relates to a polarizer protective film including the foregoing resin composition.

The polarizer protective film according to the present invention may be used as a polarizer protective film by adjusting the retardation value according to the content of the polycarbonate-based resin.

When the content of the polycarbonate-based resin is in a range of 1 wt % to 10 wt %, for example, 1 wt % to 5 wt %, an in-plane retardation value ($R_{in}$) of the polarizer protective film including the resin composition is in a range of −5 nm to 5 nm, may be in a range of −3 nm to 3 nm, and for example, may be about 0 nm, and a thickness retardation value ($R_{th}$) thereof is in a range of −5 nm to 5 nm, may be in a range of −3 nm to 3 nm, and for example, may be about 0 nm.

The resin composition may be prepared as a film according to a method well-known in the art, such as a solution cast method or an extrusion method, and the extrusion method may be used among these methods.

Biaxial drawing of the film thus prepared may be further included and the polarizer protective film may be prepared by adding a conditioner in some cases.

When the film is biaxially drawn, machine direction (MD) drawing or transverse direction (TD) drawing may be respectively performed, or both may be performed in the drawing process. In the case that both machine direction drawing and transverse direction drawing are performed, any drawing is first performed and then the further drawing may be performed, or both drawing processes may be performed simultaneously. The drawing processes may be performed in a single operation, and may also be performed through multiple operations. Drawing by means of the speed difference between rolls may be performed with respect to the machine direction drawing and a tenter may be used with respect to the transverse direction drawing. A rail start angle of the tenter is generally set to within 10 degrees to prevent a bowing phenomenon generated during transverse direction drawing and regularly control an angle of an optical axis. The effect of preventing the bowing phenomenon may be obtained when the transverse direction drawing is performed through multiple operations.

The drawing process may be performed in a temperature range from (Tg−20° C.) to (Tg+30° C.) where Tg denotes the glass transition temperature of the resin composition. The temperature range starts from a temperature at which a storage modulus starts to decrease and becomes smaller than a loss modulus and ends at a temperature at which the orientation of a polymer chain is relaxed and disappears. The glass transition temperature may be measured by a differential scanning calorimeter (DSC). The temperature during the drawing process may be, for example, the glass transition temperature of the film.

A drawing operation may be performed at a drawing speed range of 1 mm/min to 100 mm/min with respect to a small drawing machine (universal testing machine, Zwick Z010) and may be performed at a drawing speed range of 0.1 m/min to 2 m/min with respect to a pilot drawing machine. The film may be drawn by applying a draw ratio of 5% to 300%.

The polarizer protective film according to the present invention may be prepared through biaxial drawing by means of the foregoing method.

In the polarizer protective film thus prepared, an in-plane retardation value ($R_{in}$) expressed as the following Equation 1 is in a range of −5 nm to 5 nm, may be in a range of −3 nm to 3 nm, and for example, may be about 0 nm, and a thickness retardation value ($R_{th}$) expressed as the following Equation 2 is in a range of −5 nm to 5 nm, may be in a range of −3 nm to 3 nm, and for example, may be about 0 nm.

$$R_{in}=(n_x-n_y)\times d$$ [Equation 1]

$$R_{th}=(n_z-n_y)\times d$$ [Equation 2]

where $n_x$ is an in-plane refractive index of the film in a direction having the largest refractive index, $n_y$ is an in-plane refractive index of the film in a direction perpendicular to the $n_x$ direction, $n_z$ is a thickness refractive index, and d is a thickness of the film.

In the polarizer protective film according to the present invention, the in-plane retardation value and the thickness retardation value may be controlled according to the content of the polycarbonate-based resin.

Another aspect of the present invention relates to a liquid crystal display including the polarizer protective film.

When the polarizer protective film according to the present invention is applied to a liquid crystal display, the polarizer protective film may be included at any one side of a liquid crystal panel (one-film type) and the polarizer protective films may be respectively included at both sides of the liquid crystal panel (two-film type).

Since a polarizer combined with the polarizer protective film is formed of a single axially drawn polyvinyl alcohol film containing a dichroic dye, the polarizer is very weak and durability thereof with respect to temperature and moisture is poor. Therefore, the polarizer is laminated with a protective film.

The polarizer protective film and the polarizer may be laminated by a method well-known in the art and for example, the protective film and the polarizer may be laminated by a bonding method using a glue. That is, a surface of the polarizer protective film or a polyvinyl alcohol (PVA) film as the polarizer is first coated with a glue by using a roll coater, a gravure coater, a bar coater, a knife coater, or a capillary coater. Before the glue is completely dried, the polarizer protective film and the polarizer are laminated by hot pressing with a laminating roll or pressing at room temperature. When a hot-melt type glue is used, a hot-pressing roll must be used.

The glue usable during the lamination of the polarizer protective film and the polarizer may include a one-component type or two-component type of PVA glue, a polyurethane-based glue, an epoxy-based glue, a styrene butadiene rubber (SBR)-based glue, or a hot-melt type glue. However, the glue is not limited thereto. When the polyurethane-based glue is used, a polyurethane-based glue prepared by using an aliphatic isocyanate-based compound, which is not yellowed by exposure to light, may be used. When a one-component type or two-component type glue for a dry laminate or a glue having relatively low reactivity with isocyanate and a hydroxy group is used, a solution-type glue diluted with an acetate-based solvent, a ketone-based solvent, an ether-based solvent, or an aromatic-based solvent may be used. At this time, viscosity of the glue may be a low value of 5,000 cps or less. The foregoing glues may have a degree of optical transmission of 90% or more in a wavelength range of 400 nm to 800 nm as well as excellent storage stability.

An adhesive may also be used when the adhesive exhibits sufficient adhesion. The adhesive, in which mechanical strength thereof may be improved to a level of the glue through the occurrence of sufficient curing by means of heat or ultraviolet rays after the lamination, may be used and may have adhesion to such a degree that delamination is not generated without destroying any one of both films having the adhesive because interfacial bond strength is also high.

Particular examples of the usable adhesive may be a natural rubber having excellent optical transparency, a synthetic rubber or an elastomer, a vinyl chloride/vinyl acetate copolymer, polyvinylalkylether, polyacrylate, or a modified polyolefin-based adhesive, and a curable adhesive to which a hardener such as isocyanate is added.

A film formed of polyvinyl alcohol containing iodine or a dichroic dye may be used as the polarizer. The polarizer may be prepared by dying a PVA film with iodine or a dichroic dye, but a method of preparing the polarizer is not particularly limited.

Hereinafter, preferred examples are provided to allow for a clearer understanding of the present invention. However, the following examples are merely presented to exemplify the present invention, and the scope of the present invention is not limited thereto.

A method of evaluating physical properties in the present invention is as below.

1. Glass Transition Temperature (Tg): measured by using a differential scanning calorimeter (DSC) by TA instruments.
2. Retardation value ($R_{in}/R_{th}$): measured by using the AxoScan by Axometrics, Inc., after drawing at a glass transition temperature of a film plus 5° C.
3. Haze value (transparency): measured by using a HM-150 hazemeter by Murakami Color Research Laboratory.

EXAMPLES

Example 1

0.05 part by weight of dicumyl peroxide, 1 part by weight of tert-dodecyl mercaptan, and 20 parts by weight of toluene based on 100 parts by weight of a total amount of a monomer containing 90 parts by weight of methyl methacrylate and 10 parts by weight of N-phenylmaleimide were introduced into a reactor including a stirrer and bulk polymerization was performed so as to transform the introduced monomer into a polymer, while a reaction temperature of 145° C. and a retention time of 2 hours were maintained. An unreacted monomer and a solvent were removed from a polymerized reactant while conditions of a temperature of 220° C. and a vacuum pressure of 30 torr were maintained, and a copolymer resin was then obtained.

The copolymer resin thus obtained was melt mixed with 2 parts by weight of polycarbonate (DOW, DVD1080, a melt index of 80 g/10 min) at 260° C. to prepare a 240 μm thick film by using an extruder including a T-die, and 200% biaxial drawing was then performed. Physical properties were measured and the results thereof are presented in Table 2.

Example 2

A film was prepared in the same manner as Example 1 except that 87 parts by weight of methyl methacrylate, 10 parts by weight of N-phenylmaleimide, and 3 parts by weight of α-methyl styrene were used as a copolymer resin monomer while 2.5 parts by weight of polycarbonate was used, and physical properties thereof were then measured.

Example 3

A film was prepared in the same manner as Example 1 except that 92 parts by weight of methyl methacrylate and 8 parts by weight of cyclohexyl maleimide were used as a copolymer resin monomer and 3 parts by weight of polycarbonate were used, and physical properties thereof were then measured.

Example 4

A film was prepared in the same manner as Example 1 except that 90 parts by weight of methyl methacrylate, 5 parts by weight of cyclohexyl maleimide, and 5 parts by weight of α-methyl styrene were used as a copolymer resin monomer and 4 parts by weight of polycarbonate were used, and physical properties thereof were then measured.

Example 5

A film was prepared in the same manner as Example 1 except that polycarbonate having a melt index of 30 g/10 min was used, and physical properties thereof were then measured.

Example 6

A film was prepared in the same manner as Example 1 except that 87 parts by weight of methyl methacrylate, 10 parts by weight of N-phenylmaleimide, and 3 parts by weight of styrene were used as a copolymer resin monomer and 2.5 parts by weight of polycarbonate were used, and physical properties thereof were then measured.

Comparative Example 1

0.05 parts by weight of dicumyl peroxide, 1 part by weight of tert-dodecyl mercaptan, and 20 parts by weight of toluene, based on 100 parts by weight of methyl methacrylate, were introduced into a reactor including a stirrer and bulk polymerization was performed so as to transform the introduced monomer into a polymer while a reaction temperature of 145° C. and a retention time of 2 hours were maintained. An unreacted monomer and a solvent were removed from a polymerized reactant while conditions of a temperature of 220° C. and a vacuum pressure of 30 torr were maintained, and a polymethyl methacrylate resin was then obtained.

The polymethyl methacrylate resin thus obtained was melt mixed with 3 parts by weight of polycarbonate (DOW, DVD1080, a melt index of 80 g/10 min) at 260° C. to prepare a 240 μm thick film by using an extruder including a T-die, and 200% biaxial drawing was then performed. Physical properties were measured and the results thereof are presented in Table 2.

Comparative Example 2

0.05 parts by weight of dicumyl peroxide, 1 part by weight of tert-dodecyl mercaptan, and 20 parts by weight of toluene based on 100 parts by weight of a total amount of a monomer containing 92 parts by weight of methyl methacrylate and 8 parts by weight of cyclohexyl maleimide were introduced into a reactor including a stirrer and bulk polymerization was performed so as to transform the introduced monomer into a polymer while a reaction temperature of 145° C. and a retention time of 2 hours were maintained. An unreacted monomer and a solvent were removed from a polymerized reactant while conditions of a temperature of 220° C. and a vacuum pressure of 30 torr were maintained, and a copolymer resin was then obtained.

The copolymer resin thus obtained was melt kneaded at 260° C. to prepare a 240 μm thick film by using an extruder including a T-die, and 200% biaxial drawing was then performed. Physical properties were measured and the results thereof are presented in Table 2.

Comparative Example 3

0.05 parts by weight of dicumyl peroxide, 1 part by weight of tert-dodecyl mercaptan, and 20 parts by weight of toluene based on 100 parts by weight of a total amount of a monomer containing 90 parts by weight of methyl methacrylate, 5 parts by weight of cyclohexyl maleimide, and 5 parts by weight of α-methyl styrene were introduced into a reactor including a stirrer and bulk polymerization was performed so as to transform the introduced monomer into a polymer while a reaction temperature of 145° C. and a retention time of 2 hours were maintained. An unreacted monomer and a solvent were removed from a polymerized reactant while conditions of a temperature of 220° C. and a vacuum pressure of 30 torr were maintained, and a copolymer resin was then obtained.

The copolymer resin thus obtained was melt kneaded at 260° C. to prepare a 240 μm thick film by using an extruder including a T-die, and 200% biaxial drawing was then performed. Physical properties were measured and the results thereof are presented in Table 2.

Comparative Example 4

A film was prepared in the same manner as Example 1 except that polycarbonate having a melt index of 10 g/10 min was used, and physical properties thereof were then measured. The results thereof are presented in Table 2.

The results of Examples and Comparative Examples are summarized in the following Tables 1 and 2.

TABLE 1

|  |  | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|---|
| Copolymer resin composition (parts by weight) | MMA | 90 | 87 | 92 | 90 | 90 | 87 | 100 | 92 | 90 | 90 |
|  | PMI | 10 | 10 |  |  | 10 | 10 |  |  |  | 10 |
|  | CHMI |  |  | 8 | 5 |  |  |  | 8 | 5 |  |
|  | ST |  | 3 |  | 5 |  | 3 |  |  | 5 |  |
| PC (parts by weight) |  | 2 | 2.5 | 3 | 4 | 2 | 2.5 | 3 | 0 | 0 | 3 |

MMA: methyl methacrylate
PMI: phenyl maleimide
CHMI: N-cyclohexyl maleimide
ST: styrene
PC: polycarbonate

TABLE 2

|  | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|
| Tg(° C.) | 125 | 124 | 126 | 127 | 125 | 123 | 109 | 123 | 125 | 125 |
| $R_{in}/R_{th}$ | 2/2 | 2/2 | 2/3 | 2/1 | 2/2 | 2/2 |  | 4/20 | 7/13 |  |
| Haze | 0.3 | 0.2 | 0.3 | 0.3 | 0.3 | 0.2 | opaque | 0.3 | 0.3 | opaque |

As shown in Table 2, it may be understood that a polarizer protective film including the resin composition of the present invention has excellent optical properties as well as heat resistance being maintained.

A resin composition according to the present invention has excellent heat resistance and transparency. A polarizer protective film prepared by using the resin composition has excellent heat resistance, transparency, and optical properties.

While the present invention has been shown and described in connection with the exemplary embodiments, it will be apparent to those skilled in the art that modifications and variations can be made without departing from the spirit and scope of the invention as defined by the appended claims.

What is claimed is:

1. A resin composition comprising:
    an acryl-based copolymer resin including an alkyl(meth)acrylate-based monomer and an imide-based monomer, selectively copolymerizable with a styrene-based monomer; and
    a polycarbonate-based resin having a melt index (MI) of about 30 g/10 min or more under conditions of a load of about 1.2 kg and a temperature of about 300° C.

2. The resin composition of claim 1, wherein the acryl-based copolymer is a copolymer including an alkyl(meth)acrylate-based monomer and an imide-based monomer.

3. The resin composition of claim 2, wherein a content of the alkyl(meth)acrylate-based monomer is in a range of about 70 wt % to about 99 wt % and a content of the imide-based monomer is in a range of about 1 wt % to about 30 wt %.

4. The resin composition of claim 1, wherein the acryl-based copolymer is a terpolymer including an alkyl(meth)acrylate-based monomer, an imide-based monomer, and a styrene-based monomer.

5. The resin composition of claim 4, wherein a content of the alkyl(meth)acrylate-based monomer is in a range of about 69 wt % to about 98 wt %, a content of the imide-based monomer is in a range of about 1 wt % to about 30 wt %, and a content of the styrene-based monomer is in a range of about 1 wt % to about 10 wt %.

6. The resin composition of claim 1, wherein the imide-based monomer is a maleimide-based monomer substituted with a cycloalkyl group or an aryl group.

7. The resin composition of claim 1, wherein the imide-based monomer is one or more selected from the group consisting of N-phenylmaleimide, N-cyclohexylmaleimide, N-methylphenylmaleimide, N-ethylphenylmaleimide, N-butylphenylmaleimide, N-naphthylmaleimide, N-hydroxyphenylmaleimide, N-methoxyphenylmaleimide, N-carboxyphenylmaleimide, N-nitrophenylmaleimide, and N-tribromophenylmaleimide.

8. The resin composition of claim 1, wherein the styrene-based monomer is selected from the group consisting of styrene, α-methylstyrene, 3-methylstyrene, 4-methylstyrene, 2,4-dimethylstyrene, 2,5-dimethylstyrene, 2-methyl-4-chlorostyrene, 2,4,6-trimethylstyrene, cis-β-methylstyrene, trans-β-methylstyrene, 4-methyl-α-methylstyrene, 4-fluoro-α-methylstyrene, 4-chloro-α-methylstyrene, 4-bromo-α-methylstyrene, 4-t-butylstyrene, 2-fluorostyrene, 3-fluorostyrene, 4-fluorostyrene, 2,4-difluorostyrene, 2,3,4,5,6-pentafluorostyrene, 2-chlorostyrene, 3-chlorostyrene, 4-chlorostyrene, 2,4-dichlorostyrene, 2,6-dichlorostyrene, octachlorostyrene, 2-bromostyrene, 3-bromostyrene, 4-bromostyrene, 2,4-dibromostyrenc, α-bromostyrene, β-bromostyrene, 2-hydroxystyrene, and 4-hydroxystyrene.

9. The resin composition of claim 1, wherein a weight ratio between the acryl-based copolymer resin and the polycarbonate-based resin of the resin composition is in a range of about 90:10 to about 99:1.

10. The resin composition of claim 1, wherein a glass transition temperature of the resin composition is about 120° C. or more.

11. A polarizer protective film comprising the resin composition of claim 1.

12. The polarizer protective film of claim 11, wherein the polarizer protective film has an in-plane retardation value ($R_{in}$) expressed as the following Equation 1 in a range of about −5 nm to about 5 nm and a thickness retardation value ($R_{th}$) expressed as the following Equation 2 in a range of about −5 nm to about 5 nm:

$$R_{in}=(n_x-n_y)\times d \quad \text{[Equation 1]}$$

$$R_{th}=(n_z-n_y)\times d \quad \text{[Equation 2]}$$

where $n_x$ is an in-plane refractive index of the film in a direction having the largest refractive index, $n_y$ is an in-plane refractive index of the film in a direction perpendicular to the $n_x$, direction, $n_z$ is a thickness refractive index, and d is a thickness of the film.

13. The polarizer protective film of claim 11, wherein the polarizer protective film has a haze value of about 1.0 or less.

14. A liquid crystal display comprising the polarizer protective film of claim 11.

* * * * *